United States Patent
Smithsimmons et al.

(10) Patent No.: US 11,397,521 B2
(45) Date of Patent: Jul. 26, 2022

(54) COMMUNICATION SYSTEM

(71) Applicant: BRAIDED COMMUNICATIONS LIMITED, Glasgow (GB)

(72) Inventors: Andrew Peter Smithsimmons, Renfrewshire (GB); Robert Brougham, Beaconsfield (GB)

(73) Assignee: Braided Communications Limited, Glasgow (GB)

( * ) Notice: Subject to any disclaimer, the term of this patent is extended or adjusted under 35 U.S.C. 154(b) by 0 days.

(21) Appl. No.: 16/587,131

(22) Filed: Sep. 30, 2019

(65) Prior Publication Data
US 2021/0096711 A1 Apr. 1, 2021

(51) Int. Cl.
| | |
|---|---|
| *G06F 3/0485* | (2022.01) |
| *G06F 3/0482* | (2013.01) |
| *G06F 16/9038* | (2019.01) |
| *G06F 16/904* | (2019.01) |
| *H04L 47/283* | (2022.01) |
| *H04W 4/02* | (2018.01) |

(52) U.S. Cl.
CPC .......... *G06F 3/0485* (2013.01); *G06F 3/0482* (2013.01); *G06F 16/904* (2019.01); *G06F 16/9038* (2019.01); *H04L 47/283* (2013.01); *H04W 4/023* (2013.01)

(58) Field of Classification Search
CPC .. G06F 3/0485; G06F 16/9038; G06F 3/0482; G06F 16/904; H04L 47/283; H04L 51/16; H04W 4/023; G06Q 10/10
See application file for complete search history.

(56) References Cited

U.S. PATENT DOCUMENTS

| | | | |
|---|---|---|---|
| 7,085,847 B2 | 8/2006 | Darnell et al. | |
| 7,865,552 B2 * | 1/2011 | Kuhlke | H04L 51/04 709/204 |
| 8,028,250 B2 | 9/2011 | Vronay et al. | |
| 9,047,824 B2 | 6/2015 | Jain et al. | |
| 9,432,214 B2 | 8/2016 | Lal et al. | |

(Continued)

FOREIGN PATENT DOCUMENTS

| | | |
|---|---|---|
| EP | 1 366 585 B1 | 4/2006 |
| WO | 00/36789 A2 | 6/2000 |

OTHER PUBLICATIONS

Ziegel, Nathaniel; "5 Tips to help agents provide great support across multiple chats", Zendesk Blog, Sep. 2015, https://www.zendesk.com/blog/support-tips-for-multiple-chats/ (accessed on Nov. 7, 2019), 5 pages.

(Continued)

*Primary Examiner* — Jennifer N Welch
*Assistant Examiner* — Parmanand D Patel
(74) *Attorney, Agent, or Firm* — Ohlandt, Greeley, Ruggiero & Perle, L.L.P.

(57) ABSTRACT

A system and related method exchanges communications between two or more users. The system comprises a user interface that has a plurality of elements associated with a cyclic order. Each element corresponds to a communication thread. The elements have an input for receiving one or more user communications. The user interface is configured such that only one element is active at each time. Each element is continuously active for a predetermined activation time interval. The activation time interval of each element is controlled.

17 Claims, 17 Drawing Sheets

(56) References Cited

U.S. PATENT DOCUMENTS

| | | | |
|---|---|---|---|
| 2008/0169942 A1* | 7/2008 | Burstrom | G06F 3/0233 |
| | | | 341/22 |
| 2012/0304123 A1 | 11/2012 | Koradi | |
| 2013/0322255 A1* | 12/2013 | Dillon | H04L 43/0888 |
| | | | 370/236 |
| 2014/0082696 A1* | 3/2014 | Danev | H04L 9/3271 |
| | | | 726/3 |
| 2014/0195933 A1* | 7/2014 | Rao Dv | H04L 51/046 |
| | | | 715/758 |
| 2014/0282084 A1* | 9/2014 | Murarka | H04W 88/02 |
| | | | 715/752 |
| 2014/0344702 A1* | 11/2014 | Edge | G06Q 10/1091 |
| | | | 715/730 |
| 2016/0127282 A1* | 5/2016 | Nezarati | G06F 3/0481 |
| | | | 715/758 |
| 2017/0099240 A1 | 4/2017 | Evnine et al. | |
| 2018/0121034 A1 | 5/2018 | Baker et al. | |
| 2018/0159810 A1* | 6/2018 | Buchheit | H04L 51/16 |
| 2019/0364053 A1* | 11/2019 | Clements | H04L 63/108 |

OTHER PUBLICATIONS

Krauss, R., & Bricker, P. (1967). Effects of transmission delay and access delay on the efficiency of verbal communication. Journal of the Acoustical Society of America, 41, 286-292. https://asa.scitation.org/doi/abs/10.1121/1.1910338.

National Aeronautics and Space Adminislialion (2021) Human Research Roadmap: A Risk Reduction Strategy for Human Space Exploration—Integrated Research Roadmap. Updated Mar. 2021. Houston, TX: National Aeronautics and Space Adminisliation. https://humanresearchroadmap.nasa.gov/Documents/IRP_Rev-Current.pdf.

Palinkas, L. A., Kintz, N., Vessey, W. B., Chou, C-P., & Leveton, L. B. (2017). Assessing the impact of communication delay on behavioral health and performance: An examination of autonomous operations utilizing the International Space Station. NASATM-2017-219285. Houston, TX: National Aeronautics and Space Adminislialion. https://ntrs.nasa.gov/citations/20140004216.

Fischer, U. & Mosier, K. (2014). The impact of communication delay and medium on team performance and communication in distributed teams. In Proceedings of the Human Factors and Ergonomics Society 58th Annual Meeting (pp. 115-119). Santa Monica, CA: HFES. https://journals.sagepub.com/doi/abs/10.1177/1541931214581025.

Fischer, U. & Mosier, K. (2016) Protocols for asynchronous communication in space operations: Communication analyses and experimental studies. Final Report on NASA Grant NNX12AR19G. Atlanta, GA: Georgia Institute of technology. https://cpb-us-w2.wpmucdn.com/sites.gatech.edu/dist/d/917/files/2018/10/Fischer_Mosier-Protocols-for-Asynchronous-Communication-in-Space-Operations-2016.pdf.

Fischer U, Mosier K, Orasanu J. The Impact of Transmission Delays on Mission Control-Space Crew Communication. Proceedings of the Human Factors and Ergonomics Society Annual Meeting. 2013;57(1):1372-1376.

International Search Report dated Oct. 16, 2020 from corresponding International Patent Application No. PCT/GB2020/051711, 4 pages.

Written Opinion dated Oct. 16, 2020 from corresponding International Patent Application No. PCT/GB2020/051711, 6 pages.

* cited by examiner

COMMUNICATION SYSTEM

BACKGROUND OF THE DISCLOSURE

1. Field of the Disclosure

The present disclosure relates to systems and methods for exchanging communications between two or more users.

2. Description of Related Art

During space missions, it is not uncommon for astronauts to experience stressful times and undergo higher levels of strain and pressure than they are used to when on Earth. One of the causes of the stress is often the prolonged separation from family and friends. Other factors may include the impossibility to practice regular hobbies such as playing games and or music.

Modern technology allows astronauts to communicate with people on Earth via e.g. emails, messaging and voice conversation. However, independently on the form of communication, all message exchanges are affected by an intrinsic latency in the signal transmission between the spacecraft and Earth.

This may cause particularly long delays in planned human missions to Mars and other places beyond the moon's orbit. For example, it may take longer than 22 minutes to send a communication between Earth and Mars when the planets are in their farthest relative position and a space crew member may have to wait tens of minutes after sending a message to someone on Earth before receiving a reply. In these circumstances a normal conversation would be impossible. The inability to hold a conversation, especially with family or friends, can have a serious psychological and emotional impact on the space crew.

Similar issues may affect workers on Earth deployed in remote locations with very limited or intermittent connectivity.

When long delays occur in communications, it is not uncommon that out of frustration one of the persons at either end of the communication channel starts sending multiple and possibly unrelated messages without waiting for a reply creating confusion in the user at the other end and further delaying an effective response.

SUMMARY

It would be desirable to provide a communication system that enables its users to experience a continuous interaction in the exchange of communications even if the communication channel is affected by a very long latency.

Furthermore, there may be some communication systems such as instant messaging or similar applications which may not have a noticeable latency, but where the pace and/or sequence of communications could benefit from being controlled.

It is an object of the disclosure to address one or more of the above-mentioned limitations.

According to a first aspect of the disclosure, there is provided a system for exchanging communications between two or more users, the system comprising a graphical user interface wherein the graphical user interface has a plurality of graphical elements; the plurality of graphical elements is associated with a cyclic order; each graphical element corresponds to a communication thread; the graphical elements have an input for receiving one or more user communications; and wherein the graphical user interface is configured such that only one graphical element is active at each time and each graphical element is continuously active for a predetermined activation time interval; and the activation time interval of each graphical element is controlled.

Optionally, a graphical element is active if the input of new communications into that graphical element is enabled and the activation time interval of each graphical element is controlled according to a latency parameter.

Optionally, the latency parameter is related to an estimate, calculation or measure of the latency of the communication channel over which the communications are sent.

Optionally, the latency parameter is updated automatically as the latency of the communication channel changes.

Optionally, at least one user among the said two or more users is in space and the latency of the communication channel is estimated or calculated based on the distance between the two users that are farthest away from each other.

Optionally, the latency parameter is related to a behaviour of at least one user among the said two or more users.

Optionally, the behaviour comprises the average time taken to input a communication.

Optionally the graphical elements are represented in the graphical user interface according to the cyclic order.

Optionally the graphical elements are arranged in the graphical user interface in a carousel configuration.

Optionally each communication thread corresponds to a conversation topic.

Optionally, the number of graphical elements is also controlled according to the latency parameter.

Optionally, the system comprises at least a first user terminal for use by a first user among the said two or more users and a second user terminal for use by a second user among the said two or more users, each terminal having a display configured to display the graphical user interface.

Optionally, the system further comprises at least one memory and one engine configured to interact with the first user terminal and with the second user terminal and wherein each user terminal comprises an input unit for inputting user communications.

According to a second aspect of the disclosure, there is provided a method for exchanging communications between two or more users, the method comprising: providing a graphical user interface which has a plurality of graphical elements; associating the plurality of graphical elements with a cyclic order; associating each graphical element to a communication thread; and inputting one or more user communications into the graphical element; wherein the graphical elements are activated one at a time and for a predetermined activation time interval; and the activation time interval of each graphical element is controlled.

Optionally, controlling the activation time interval of each graphical element comprises adjusting the activation time interval based on a latency parameter.

Optionally, controlling the activation time interval of each graphical element further comprises estimating, calculating or measuring the latency of the communication channel over which the communications are sent and the latency parameter is related to the estimate or measure of said latency of the communication channel.

Optionally, estimating or calculating the latency of the communication channel comprises estimating or calculating a distance between the two users among the said two or more users that are farthest away from each other and accessing data stored in a memory to determine a corresponding latency.

The method of the second aspect may also incorporate using or providing features of the first aspect and various other steps as disclosed herein.

According to a third aspect of the disclosure there is provided a system for exchanging communications between two or more users, the system comprising a user interface wherein: the user interface provides a plurality of communication threads associated with a cyclic order; and the user interface is configured such that only one communication thread is active at each time and each communication thread is continuously active for a predetermined activation time interval; and the activation time interval of each communication thread is controlled.

According to a fourth aspect of the disclosure there is provided a method for exchanging communications between two or more users, the method comprising: providing a user interface which has a plurality of communication threads; associating the plurality of communication threads with a cyclic order; wherein the communication threads are activated one at a time and for a predetermined activation time interval; and the activation time interval of each communication thread is controlled.

The system of the third aspect and the method of the fourth aspect may each make use of various features described as above for the first and second aspects and as described elsewhere herein.

BRIEF DESCRIPTION OF THE DRAWINGS

The disclosure is described in further detail below by way of example and with reference to the accompanying drawings, in which.

DESCRIPTION

Figure 1A:
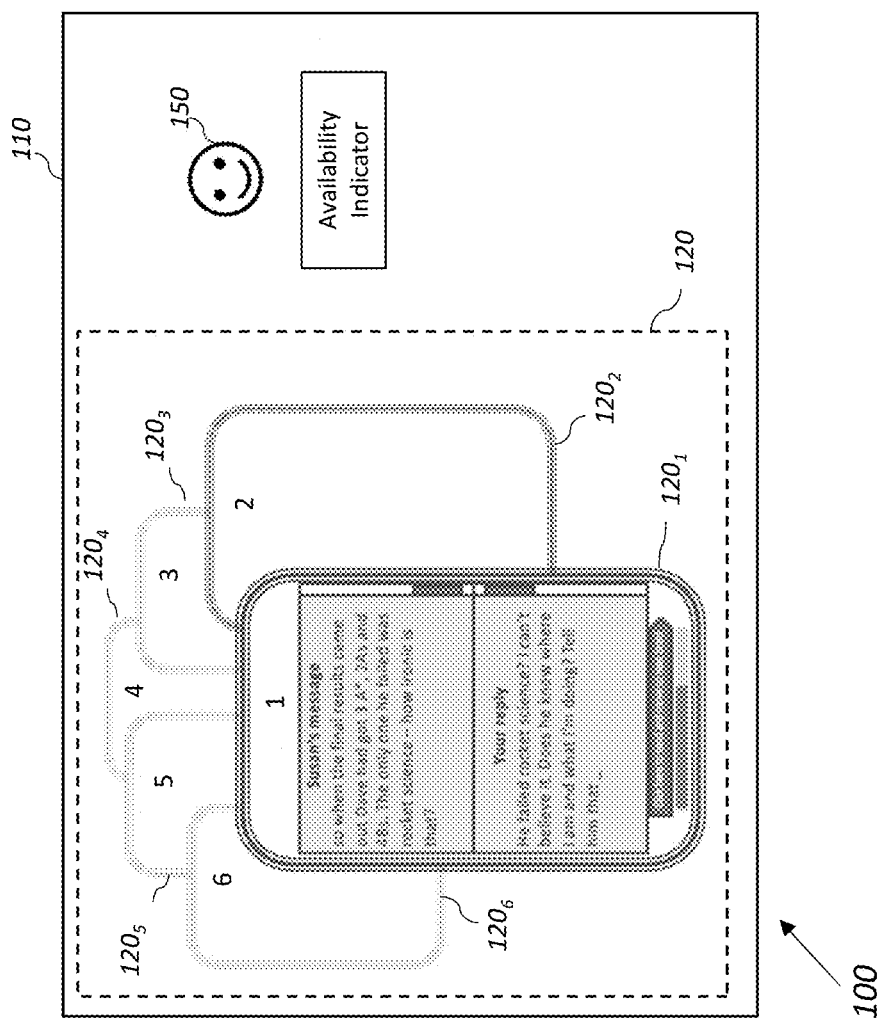
FIG. 1A is a schematic diagram of a system according to the present disclosure provided with a graphical user interface.

FIG. 1A is a schematic diagram of a system 100 for exchanging communications between two or more users and in accordance with the present disclosure. The system 100 comprises a graphical user interface 110 that the two or more users can interact with for exchanging the communications. It will be appreciated that FIG. 1A is just a stylized example of how the graphical user interface 110 may appear to the users and that in different embodiments the graphical user interface may have a different appearance. It will also be appreciated that although only one instance of the graphical user interface is shown in FIG. 1A, each user taking part in a communication session will interact with their own instance of the graphical user interface. Here and in the following, it is implied that the graphical user interface as shown in each FIG. is illustrated as it may appear to any one of the users, unless otherwise specified.

Figure 1B:
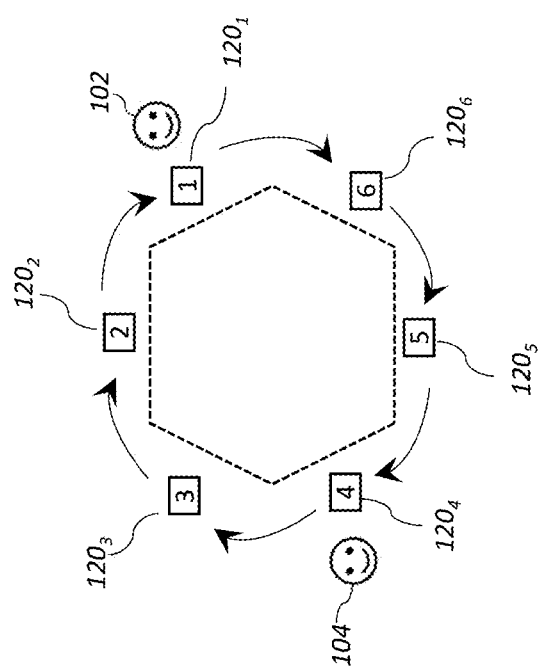
FIG. 1B is a schematic diagram illustrating the functionality of the system of FIG. 1A

FIG. 1B is a further schematic diagram illustrating the functionality of the system 100. Common features between figures share common reference numerals.

FIGS. 1A and 1B show the system 100 in use during a communication session by a first user 102 and a second user 104. The graphical user interface 110 may also be referred to as "braided space" and the first user 102 and the second user 104 may be referred to as participants to the braided space. The graphical user interface 110 is configured to receive input communications by a user and send them to the other user.

In order to enable each user to simultaneously manage multiple threads of conversation or "braids" with the other user, the graphical user interface 110 comprises a plurality 120 of graphical elements $120_i$, where i is an integer index that can take any value up to the number of graphical elements in the plurality of graphical elements. Each graphical element $120_i$ corresponds to a conversation thread and has an input for receiving user communications. Each graphical element $120_i$ is further configured to enable the user to access past communications related to that specific conversation thread.

The number of braids (or graphical elements) can be any number equal or greater than the number of participants to the braided space. For example, in the scenario depicted in FIG. 1, the number of graphical elements $120_i$ is six but could have been any other number equal or greater than two, since there are two participants.

The graphical user interface 110 is configured to assign to the graphical elements $120_i$ a cyclic order in which each graphical element has a previous graphical element and a next graphical element. The cyclic order is shown in FIG. 1 by way of numerals from 1 to 6. The cyclic order determines the order by which the user inputs new communications in the various graphical elements. It should be understood that the numerals in FIG. 1 are only shown to represent the ordering and that there might be no numerals actually displayed to the users on the graphical user interface 110 and/or that different numerals or other type of labels may be used.

In order to ensure that the user deals with one conversation thread at a time and at a controlled pace, the graphical user interface 110 is configured to activate only one graphical element $120_i$ at a time and according to the cyclic order. The graphical user interface 110 is further configured to maintain each graphical element active $120_i$ for a predetermined activation time interval $\Delta t_i$. Here and in the following, to "activate" a graphical element means to enable the input of new communications by the user via interaction with that graphical element and an "active graphical element" means a graphical element in which the input of communications by the user is currently enabled.

At the end of each activation time interval $\Delta t_i$, the graphical user interface 110 automatically sends any communication input by the user in the currently active graphical element to the other user.

In order to facilitate a logical conversation, in preferred embodiments the system 100 is configured such that during a communication session a given graphical element $120_i$ may never be simultaneously active for two different users. The system 100 may further be configured such that, when a given braid $120_i$ ceases to be active for a given user, the corresponding graphical element will not be activated again for that user until it has been activated one time for each of the other users. This ensures that a user can not input two consecutive communications in a graphical element without waiting for the other users' reply.

For each communication session, the system 100 may be configured to randomly select which graphical element will be activated first for a random user and then assign which graphical elements will be activated first for each of the other users based on the number of braids and/or of participants to the communication session. Alternatively, the system 100 may be configured to allow one or more users to indicate one or more preferred graphical elements that they wish to be activated first and input such preferences into an algorithm to assign a different element to each user.

In preferred embodiments, each activation time interval $\Delta t_i$ is set to an optimal value which is the same for all graphical elements $120_i$ and which is chosen such that each user can experience a feeling of continuity in the interaction with the other user despite any potential delay in signal transmission. In other embodiments, the activation time intervals $\Delta t_i$ may be set to different values for different graphical elements $120_i$. Either way, the system 100 is configured to store a received communication related to a specific braid or graphical element $120_i$ in a memory or buffer if the communication is received ahead of the time at which said graphical element $120_i$ is due to be activated.

The system 100 may be configured to show on the graphical user interface which participants are due to join or have joined the braided space by displaying a different indicator for each different participant. For example, in FIG. 1 an indicator 150 informs the user of the graphical user interface that the other participant is present. It will be appreciated that an indicator may consist of any sort of visual data displayable by a GUI, such as text string, image, drawing, GIF, video, etc. and that different indicators may be shown to different users. The indicator, in whatever form, may have multiple states representing for example "we are aware of this user but there is no current session scheduled"; "user X was scheduled to join this braided space at this time so should now be on-line and interacting with their first braid"; "we have now received log on confirmation so we know that user X has indeed logged on and is "present"; or some other statuses as chosen. Each indicator status may be represented by different colours, highlights or emphasis of the indicators. In some embodiments, an indicator may not be shown until a user has logged on.

Figure 2:
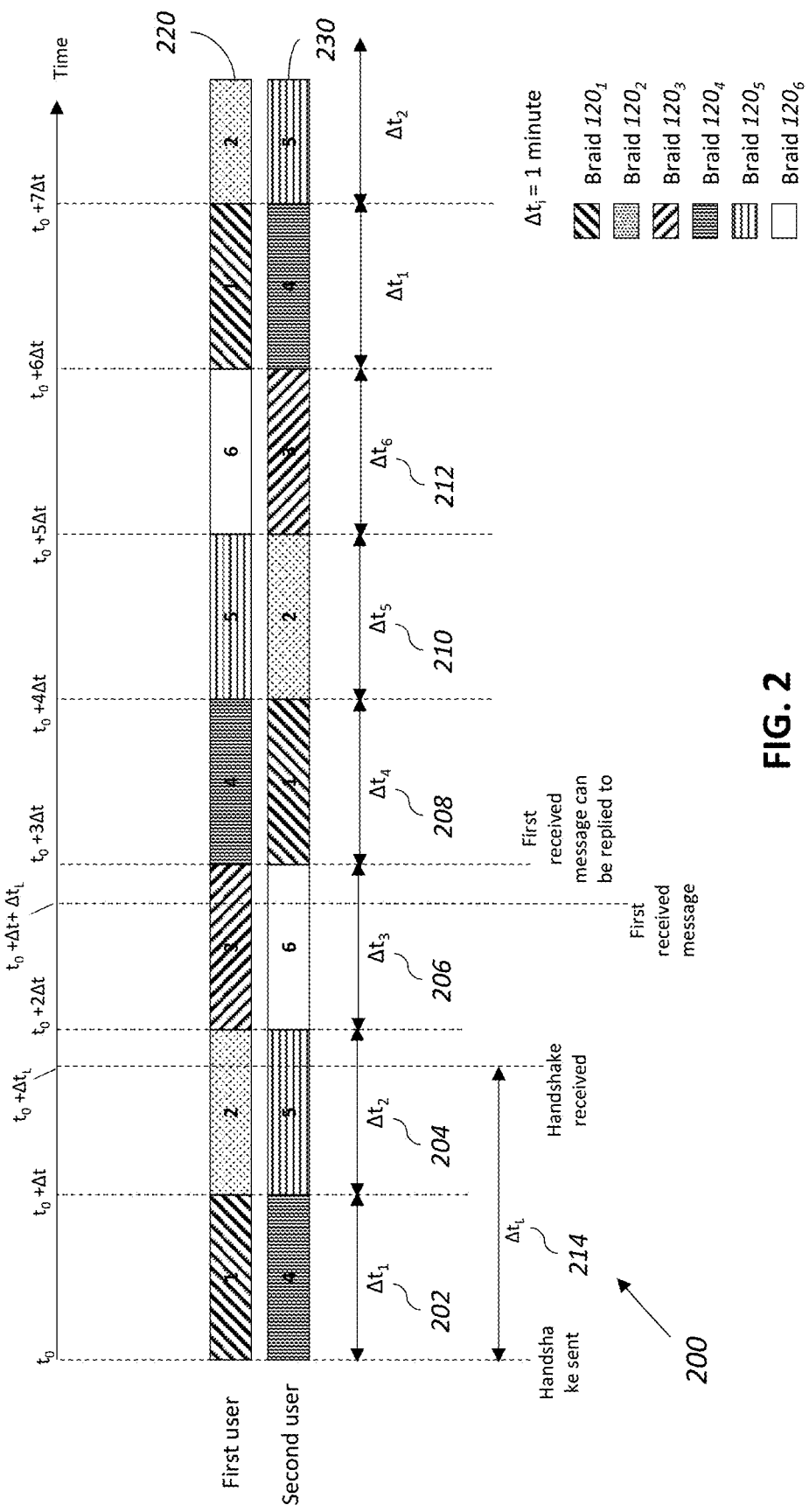
FIG. 2 is a time diagram illustrating a first operation mode of the system of FIG. 1.

FIG. 2 is a time diagram illustrating a first operation mode of the system 100 of FIG. 1. The time diagram 200 shows the timing of the exchange of communications between the first user and the second user of FIG. 1 during a first phase of a communication session. In this example, the first user is an astronaut in transit towards Mars and the second user is a relative who is somewhere on Earth. The astronaut and the relative are communicating to each other via text-based messages by using the graphical user interface 110 of FIG. 1. Six braids, corresponding to the six graphical elements 120, are used in the communication session and each braid corresponds to a previously agreed topic.

The time diagram 200 comprises two rows 220 and 230 illustrating which graphical element $120_i$ is active at a given time for the astronaut and the relative respectively. The different filling patterns and numerals in the rows 220 and 230 correspond to different braids and graphical elements $120_i$.

The astronaut is at a distance of 1 light minute and 45 light seconds from Earth. This means that whichever communication technology is used for enabling the exchange of communications between the astronaut and the relative, the communication channel will be affected by an intrinsic latency of at least 1 minute and 45 seconds. For simplicity, we will assume an ideal scenario wherein the latency of the communication channel 214 is exactly $\Delta t_L = 1'45''$. Therefore, for each message sent by the astronaut, the earliest a response can be received is $3'30''$ after the sending of the message.

In order to fill this gap, the communication session is setup with six braids and all activation time intervals $\Delta t_i$ are set to $\Delta t = 1$ minute so that, from $2'45''$ after the start of the communication session onwards every minute the astronaut is able to receive a reply from the relative.

With reference to the diagram, at a time to previously agreed the astronaut and the relative join the communication session and their respective graphical user interfaces send a handshake message to the other participant.

During a first timestep 202 the graphical element $120_1$ is active for the astronaut, who inputs a text related to the topic associated with the braid $120_1$ and the graphical element $120_4$ is active for the relative, who inputs a text related to the topic associated with the graphical element $120_4$.

At time $t_0 + \Delta t$ the respective texts are automatically sent to the other participant by the system 100 and a new graphical element is activated for each of them. In particular, graphical element $120_2$ is activated for the astronaut and graphical element $120_5$ is activated for the relative.

During a second time step 204 the astronaut and the relative each input a second message related to the respective new conversation threads.

At time $t_0 + \Delta t_L$ the handshake messages sent at time to are received by each participant and the graphical user interface 110 notifies the astronaut and the relative that the other participant is present. The notification may comprise modifying the appearance of the indicators 150, 152 or showing the indicator 150, 152 if they were not previously shown.

At time $t_0 + 2\Delta t$ the messages input in the graphical elements $120_2$ and $120_5$ are sent and graphical elements $120_3$ and $120_6$ are activated for the astronaut and the relative respectively. New messages are input in the activated graphical elements during the time step 206 and then sent at time $t_0 + 3\Delta t$. Meanwhile, the messages input by the astronaut and the relative during the first timestep 202 in the graphical element $120_1$ and $120_4$ are received by the relative and the astronaut respectively.

However, the messages are not displayed until the corresponding graphical elements are activated. In this example, the graphical elements $120_4$ and $120_1$ are activated by the graphical user interface 110 at time $t_0+3\Delta t$. Hence at time $t_0+3\Delta t$ the astronaut and the relative can see for the first time a message sent by the other participant.

In the following time steps 208, 210 and 212 the astronaut and the relative interact with the graphical elements in the same way as per previous intervals, however at each new interval the activated graphical element $120_i$ will display a message from the other participant, to which they can reply.

At time $t_0+6\Delta t$ the astronaut and the relative have cycled one time through all graphical elements 120 and the first graphical element that they had interacted with is activated again. This process may then repeat for as long as the astronaut and the relative stay in the braided space.

Figure 3:
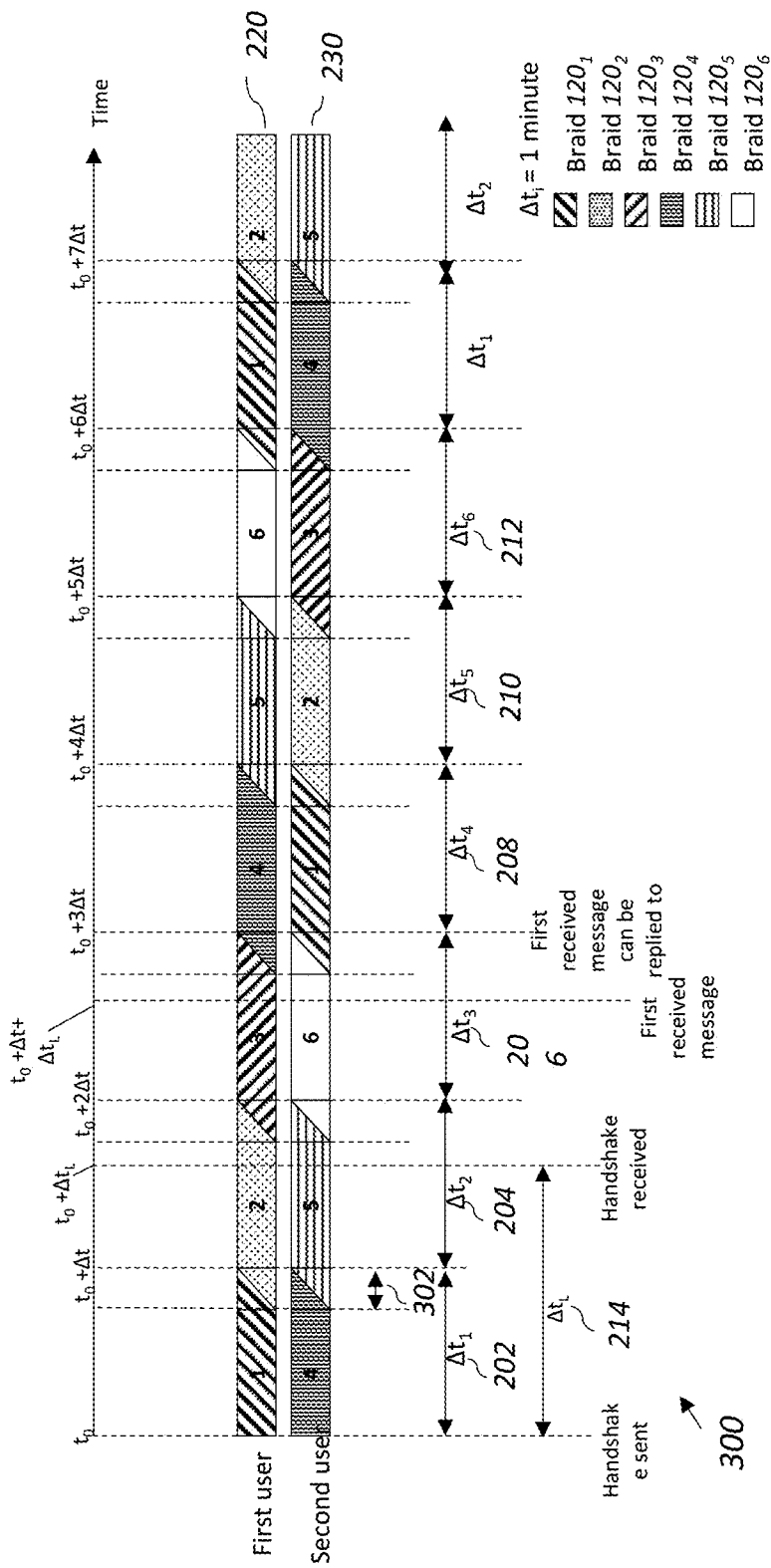
FIG. 3 is a time diagram illustrating a second operation mode of the system of FIG. 1.

Optionally, the graphical user interface 110 may be configured to allow the astronaut and the relative to prompt the sending of a message in graphical element $120_i$ and the activation of the next graphical element $120_{i+1}$ before the activation time interval $\Delta t_i$ has lapsed, as shown in FIG. 3.

The diagram 300 is analogous to the diagram 200 but illustrates a second operation mode according to which the astronaut and the relative can each independently choose to anticipate the sending and the activation of the next graphical element by a desired amount of time up to a maximum time interval $\Delta t_A$ 302. For example, if the astronaut finishes typing the message in the graphical element $120_1$ by time $t_0+\Delta t-\Delta t_A$, they can choose to send the message at any time between $t_0+\Delta t_A$ and $t_0+\Delta t$ and move on to the graphical element $120_2$. Then the graphical element $120_2$ will remain active at least until time $t_0+2\Delta t-\Delta t_A$, at which time the astronaut will again have a choice of moving on to the following graphical element $120_3$ ahead of the lapse of the activation time interval $\Delta t_3$ or waiting for the graphical user interface 110 to automatically send the message in graphical element $120_2$ and activate the graphical element $120_3$. The same applies to each graphical element and time step for each participant independently.

By using an appropriate number of braids and optimal activation time intervals $\Delta t_i$ the system 100 enables the users to experience a feeling of continuous interaction even when the communication channel is affected by a very long latency. This helps reduce the stress and psychological impact that humans might experience when spending long periods of time in space and/or remote locations with limited connection to their relatives and friends.

Psychological research studies and/or user preferences may be used to determine the best approach for computing the optimal activation time intervals $\Delta t_i$ and number of braids. Different approaches may be used for different scenarios and/or users.

In some embodiments, the system 100 comprises software or hardware implemented devices for estimating, calculating or measuring the latency of the communication channel and the graphical user interface 110 is configured to set each activation time interval $\Delta t_i$ equal to an optimal value which is determined based on the estimated or measured latency of the communication channel.

Furthermore, in some embodiments for use in space, the system 100 may comprise a locating device for detecting the current spatial coordinates of a spacecraft on which a user is located and a memory on which a look-up table is stored. The look-up table may contain a set of spatial coordinates and related latency data and the graphical user interface 110 may be configured to access the memory in order to determine the latency of the communication channel based on the present spatial coordinates. Alternatively or in addition, the memory may contain a plan of the spatial route that the spacecraft is due to follow and the latency of the communication channel may be estimated or calculated based on the current time and associated predicted position of the spacecraft according to the planned route stored in the memory.

In some embodiments, the activation time intervals $\Delta t_i$ are continuously updated based on the current distance between at least two users of the system.

In some embodiments, the system 100 comprises an engine and a timer and is configured to select optimal activation time intervals $\Delta t_i$ based on parameters describing the participants' behaviour. In particular, the system 100 may be configured to detect and store data related to the average response time of a user and update the activation time intervals $\Delta t_i$ accordingly. For example, the graphical user interface 110 may be configured to increase a specific activation time interval $\Delta t_i$ if the system 100 learns over time that a user often fails to input a communication within the activation time interval $\Delta t_i$.

Similar considerations as laid out for the time interval will not be repeated for the sake of brevity but may also apply to the selection of the optimal number of braids.

In some embodiments, the graphical user interface 110 may be configured to determine a recommended range of values, rather than a single optimal value, for each activation time interval $\Delta t_i$ and number of braids and the user may be allowed to select any value within the recommended range of values.

In some embodiments, the graphical user interface 110 may contain pre-set pairs of recommended values for the number of braids and for a single activation time interval $\Delta t$ to be used for all braids and the user may only be allowed to select one of the pre-set pairs of values.

Alternatively or in addition, the system 100 may be configured to suggest pre-set values for either or both the parameters based on previously saved user preferences, data acquired in antecedent behavioural tests, historical data from past communication sessions, user behavioural data extrapolated via machine learning or other types of algorithm and/or any combination thereof.

The system 100 may be configured to require the number of braids and activation time interval $\Delta t_i$ to be set in advance of the communication session. With reference again to the case wherein the first user is an astronaut in space and the second user is a relative on Earth, the astronaut may be required to perform a setup procedure prior to the time they wish to communicate with the relative and indicate a series of preferences to setup the braided space. The setup procedure may be implemented by the system 100 and performed by the user by interacting with the graphical user interface 110 or it may be implemented by a separate system.

FIGS. 4 to 9 illustrate an example setup procedure of a braided space wherein all activation time intervals $\Delta t_i$ are the same.

Figure 4:
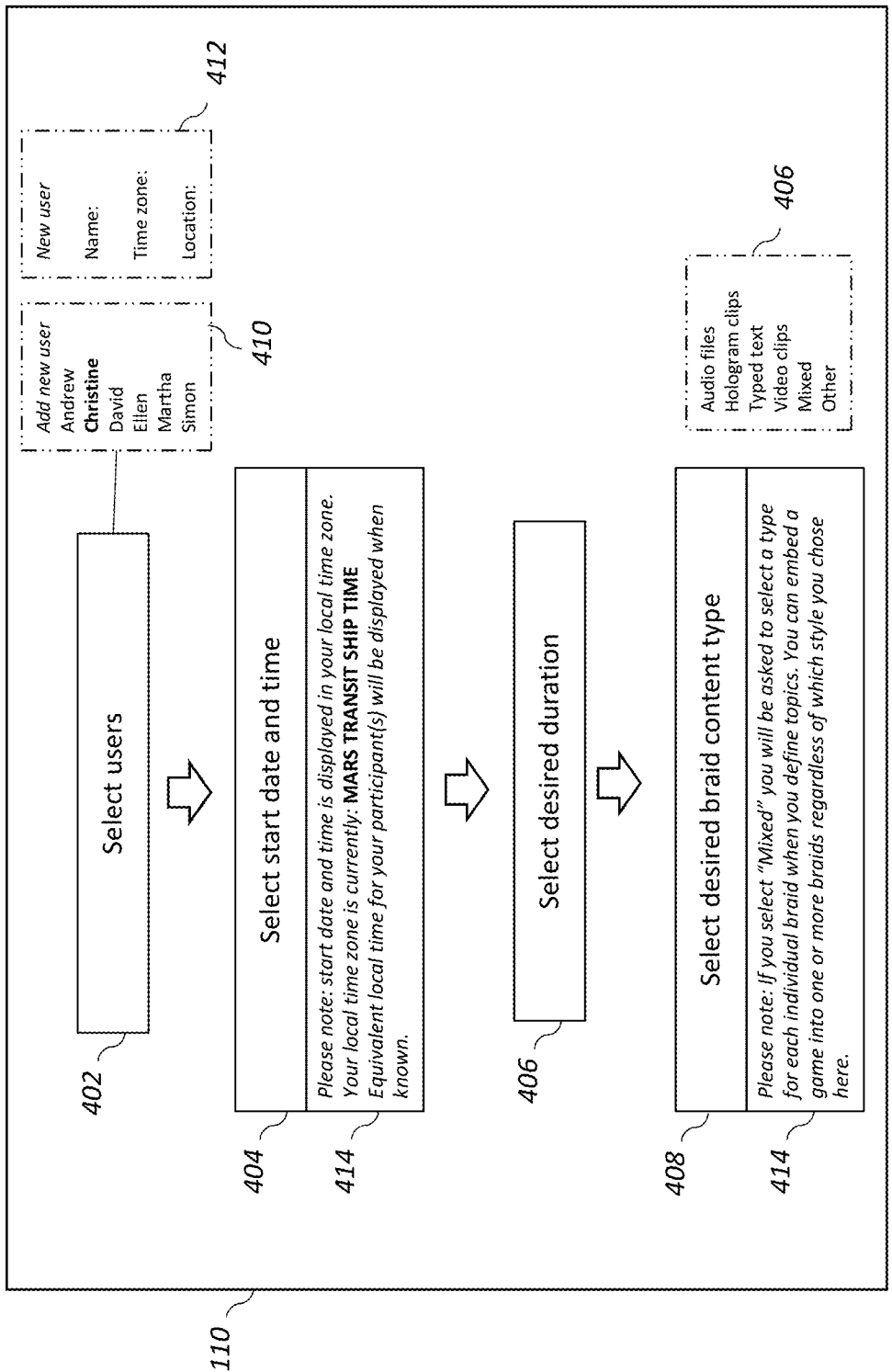
FIG. 4 is a schematic diagram of the graphical user interface of FIG. 1 shown in a first timestep of a setup procedure.

FIG. 4 is a schematic diagram of the graphical user interface 110 in a first timestep of the setup procedure. The graphical user interface 110 is shown from the point of view of the astronaut.

The astronaut is prompted to select a set of parameters, including which users they would like to communicate (402), a start date and time (404), a desired duration for the communication session (406) and a desired graphical element content type (408).

The user with whom they wish to communicate can be selected from a list of saved users 410 or a new user can be added by filling in entry fields 412. In this example, the selected user would be the astronaut's relative.

The graphical element content type may be audio, text or video, to name just a few, and may be the same for all graphical elements 120 or a different graphical element content type may be setup for each graphical element.

In some embodiments, the graphical user interface 110 may be configured to allow the participants to modify the braid content type during a communication session or to have multiple types of content in a graphical element.

The graphical user interface 110 may further display tip boxes 414 containing directions for the astronaut on how to set the requested parameters.

Figure 5:
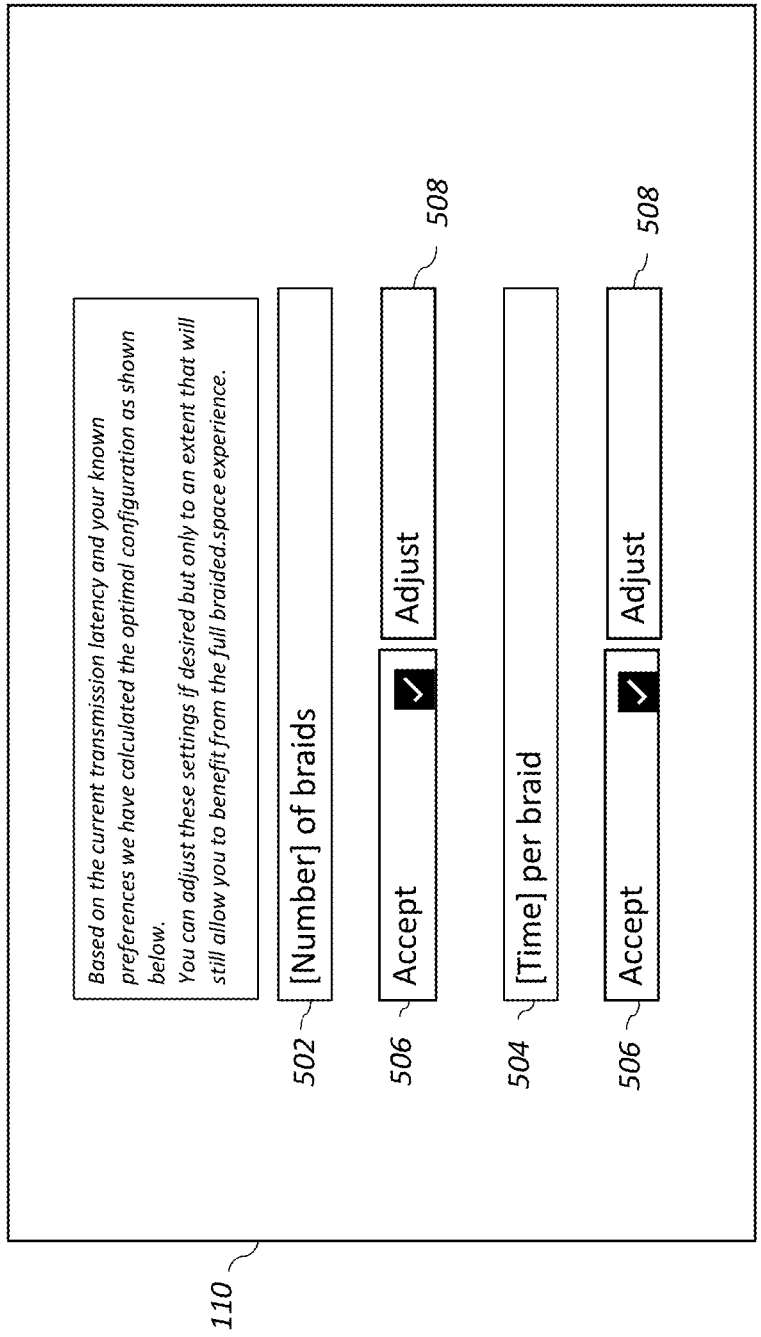
FIG. 5 is a schematic diagram of the graphical user interface of FIG. 1 shown in a second timestep of the setup procedure of FIG. 4.

FIG. 5 is a schematic diagram of the graphical user interface 110 in a second timestep of the setup procedure and shown from the point of view of the astronaut. The graphical user interface 110 displays a recommended number of braids (502) and activation time interval $\Delta t$ (504). The astronaut can select either an accept option (506) or an adjust option 508 for each recommended value.

Figure 6:
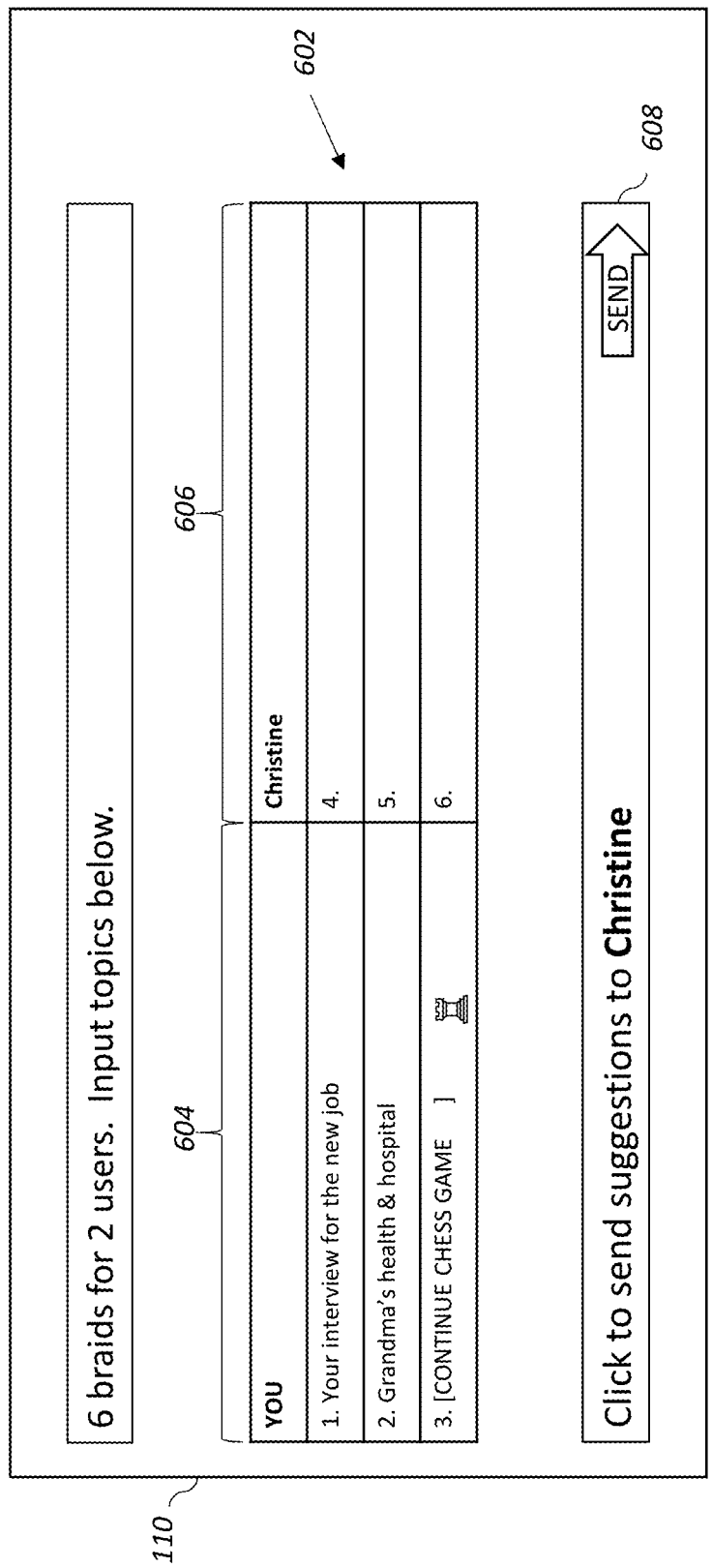
FIG. 6 is a schematic diagram of the graphical user interface of FIG. 1 shown in a third timestep of the setup procedure of FIG. 4.

FIG. 6 is a schematic diagram of the graphical user interface 110 in a third timestep of the setup procedure and shown from the point of view of the astronaut. The graphical user interface 110 displays a table 602 which has as many columns as the number of users selected by the astronaut in the first timestep of the setup procedure and as many rows as half the number of braids selected by the astronaut during the second timestep of the setup procedure. In this example, the table 602 has one column 604 for the astronaut and one column 606 for the relative and 4 rows for a total of 8 braids.

The astronaut is prompted to insert suggestions of topics for half of the braids in their column 604. It will be appreciated that topic herein has a broad meaning and does not necessarily correspond to a conversation topic. For example, it may correspond to a game or activity that the astronaut wants to engage in a given graphical element. It will also be appreciated that in different examples of the setup procedure the astronaut may be asked to input topic suggestions for any number of braids from zero to the total number of braids.

The graphical user interface 110 further displays a send command 608 that the astronaut can select to send their suggestions to the relative.

Figure 7:
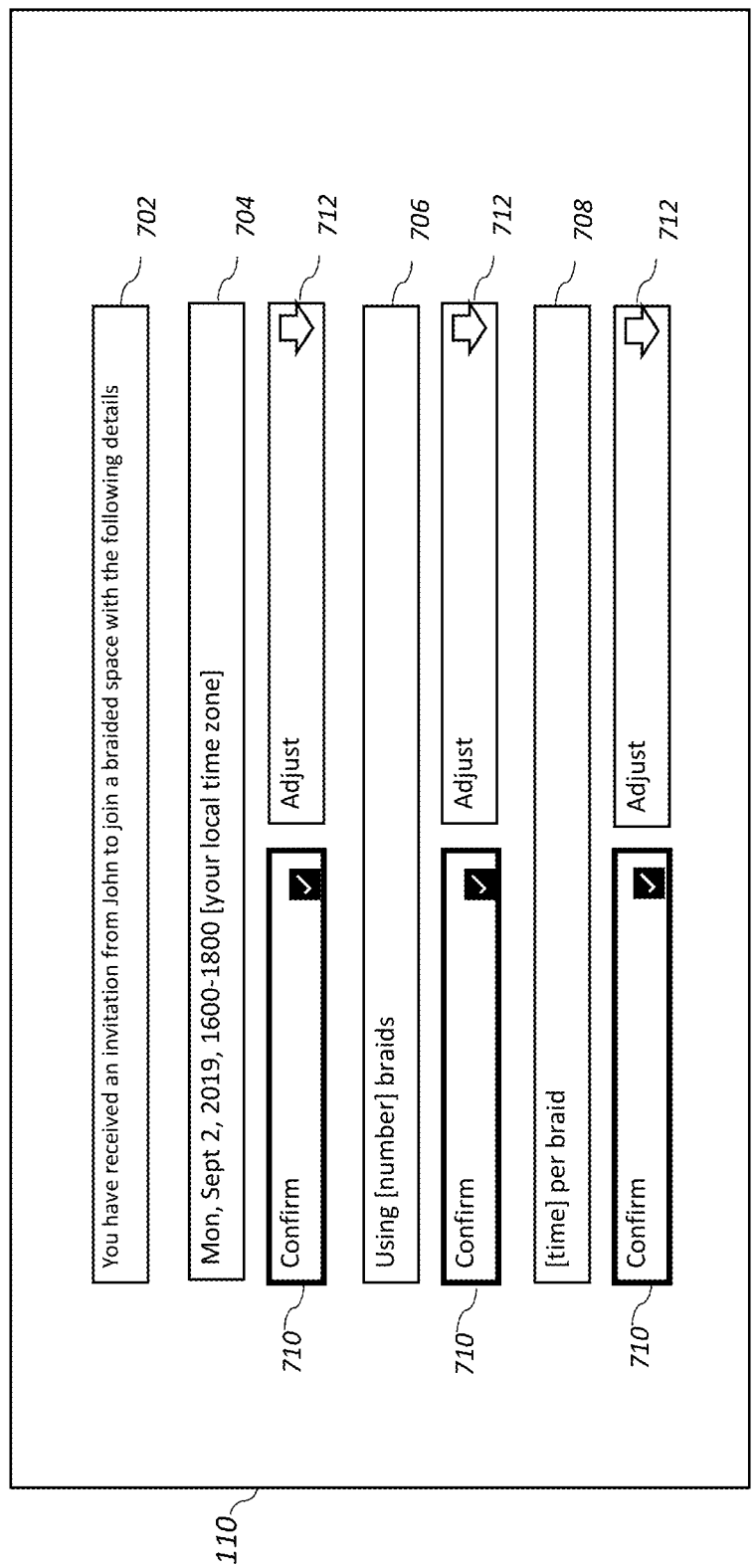
FIG. 7 is a schematic diagram of the graphical user interface of FIG. 1 shown in a fourth timestep of the setup procedure of FIG. 4.

FIG. 7 is a schematic diagram of the graphical user interface 110 in a fourth timestep of the setup procedure and shown from the point of view of the relative. The graphical user interface 110 displays a first message 702 informing the relative that an invitation to join the braided space has been received. The graphical user interface 110 further displays a second (704), a third (706) and a fourth (708) message containing the beginning time of the communication session, the number of braids and the time per braid selected by the astronaut. The relative can confirm (710) or adjust (712) each of the parameters by selecting the corresponding commands displayed below each message.

If the relative modifies any of the parameters, they might have to wait until the astronaut has accepted the adjusted parameters. In some embodiments, the system 100 is configured such that the participants will agree on the topics via an iterative exchange of suggestions. The graphical user interface 110 may also comprise a comment box wherein the users can input comments on the choices of the other participants to speed up the selection process and reduce the number of iterations in the setup procedure.

Figure 8:
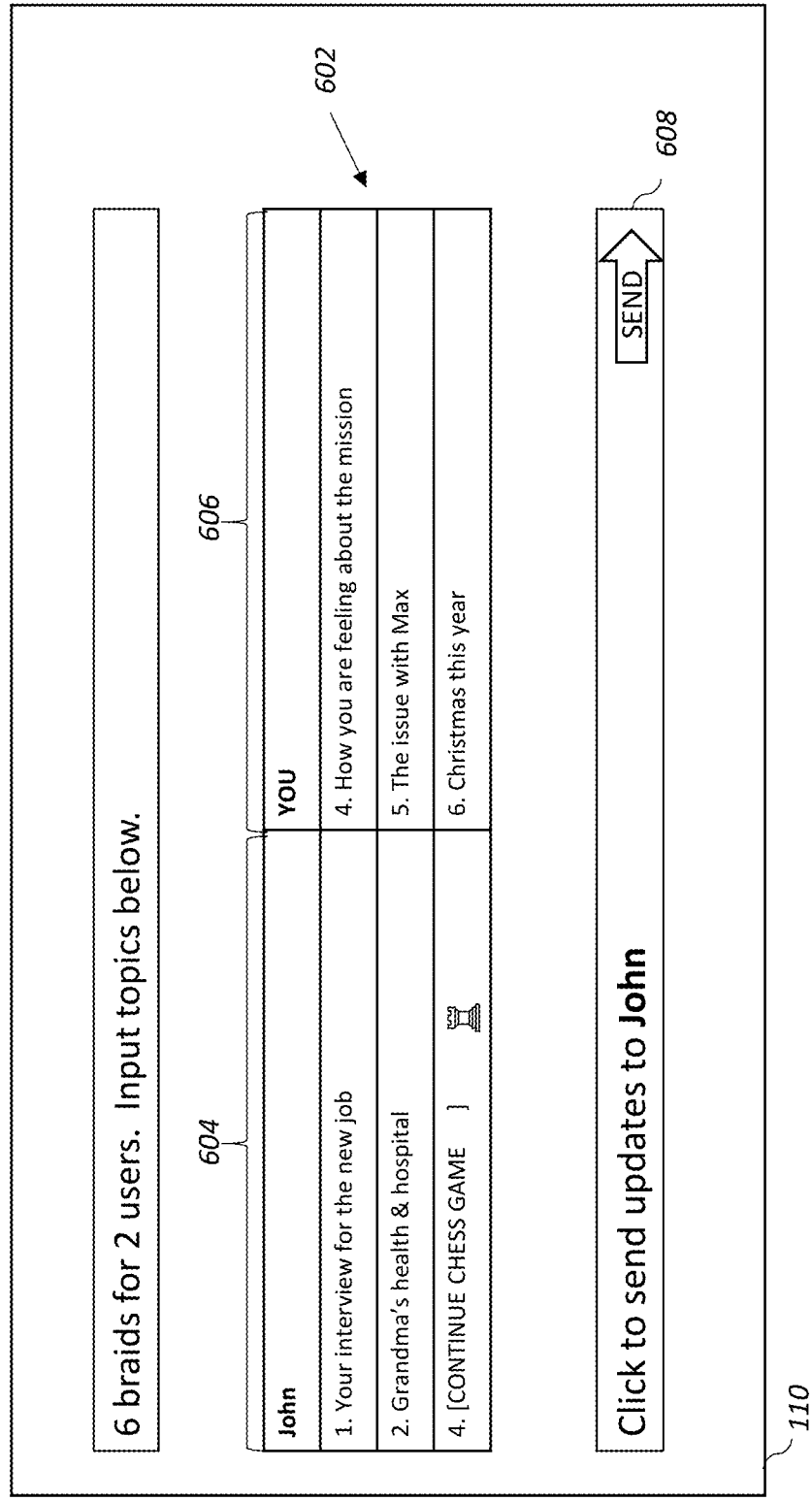
FIG. 8 is a schematic diagram of the graphical user interface of FIG. 1 shown in a fifth timestep of the setup procedure of FIG. 4.

FIG. 8 is a schematic diagram of the graphical user interface 110 in a fifth timestep of the setup procedure, shown from the point of view of the relative and assuming they have accepted the parameters in the fourth timestep. The graphical user interface 110 displays the table 602 containing topics suggested by the astronaut for each braid. The relative is prompted to insert suggestions of topics for the other half of the agreed number of braids in the column assigned to themselves 604. After the relative has inserted their suggestions, they are prompted to send the updates to the astronaut by selecting the send command 608.

Figure 9:
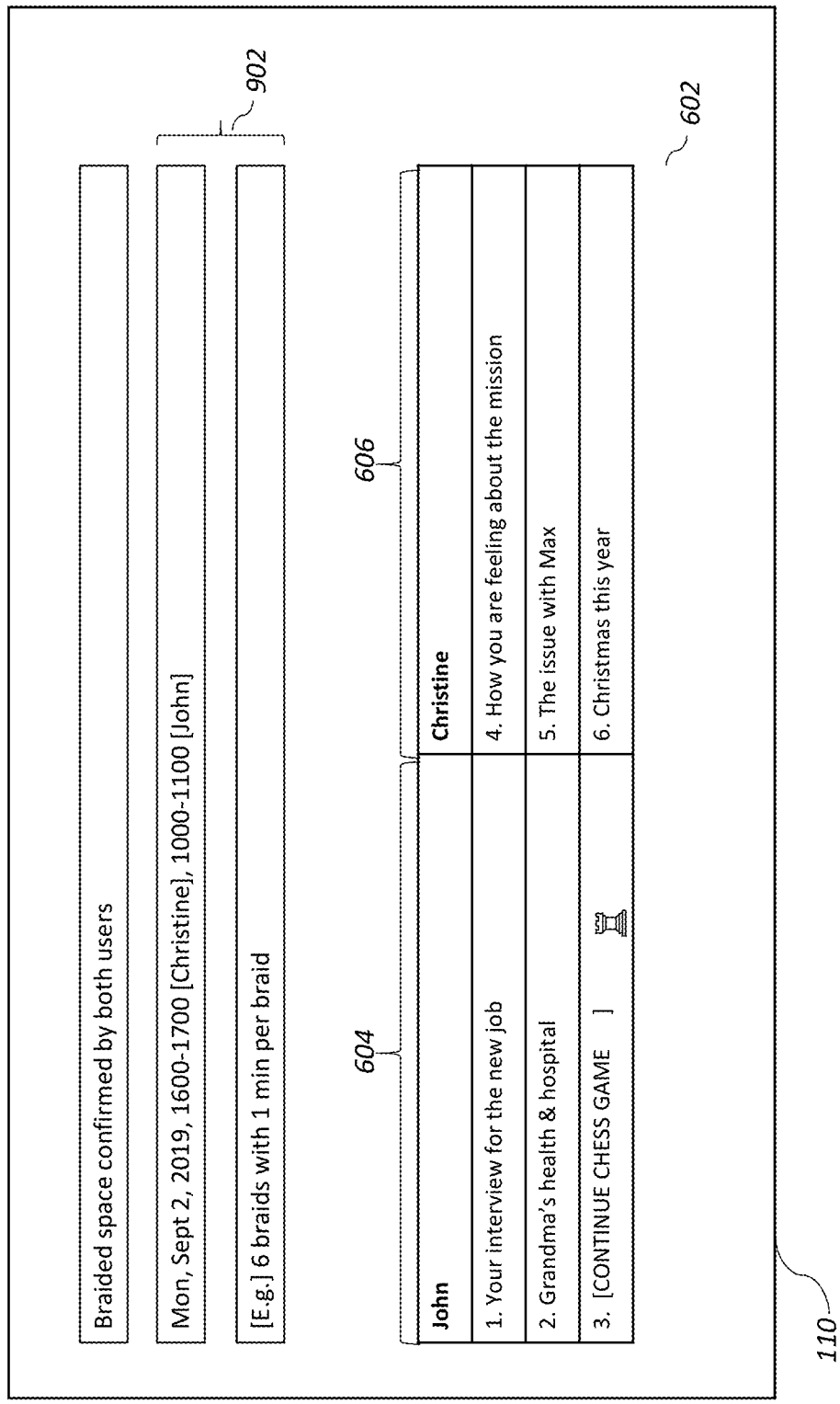
FIG. 9 is a schematic diagram of the graphical user interface of FIG. 1 shown in a sixth timestep of the setup procedure of FIG. 4.

FIG. 9 is a schematic diagram of the graphical user interface 110 in a sixth timestep of the setup procedure, shown from the point of view of either the astronaut or the relative. The graphical user interface 110 displays reminders 902 of the agreed beginning and end time, list of participants, number of braids and time per braid. The graphical user interface 110 further displays the table 602 containing the topic suggestions for each braid.

It will be appreciated that many variations of the above setup procedure are possible without departing from the present disclosure.

The graphical user interface 110 may be configured to limit the number of times invited participants adjust settings suggested by the user who first sent the invitation or it may configured to leave more choice flexibility to some users based on their psychological needs or other criteria. For example, studies might prove the psychological benefits achieved by the braided communication may be ineffective if a number of braids greater than a maximum threshold is used and the graphical user interface may be configured to impose a limit based on the maximum threshold of, for example, 6 braids in every communication session.

In some embodiments, the system 100 comprises a memory in which user's setup preferences may be saved. The memory may comprise precompiled lists of suggested topics, such as "children" or "holiday" or a game. The list may also comprise suggested activities such that the users may use the corresponding graphical element to engage in recreational, artistic or other sorts of machine-interfaced interactive activities with the other participants. Any suggested list may be tailored to the specific scenario and psychological need of the user. For example, games that require strategical thinking such as chess may be automatically suggested in scenarios wherein the time per graphical element and the number of braids allow the user long enough pauses to think about the next move.

The graphical elements 120 may be displayed in any configuration. However, in preferred embodiments the graphical user interface 110 will only allow configurations wherein the graphical elements are arranged according to the predetermined cyclic order. In particular, in some embodiments the graphical elements 120 are displayed in the graphical user interface 110 in a 3D carousel-like configuration wherein they are ordered according to the predetermined cyclic order.

Figure 10:
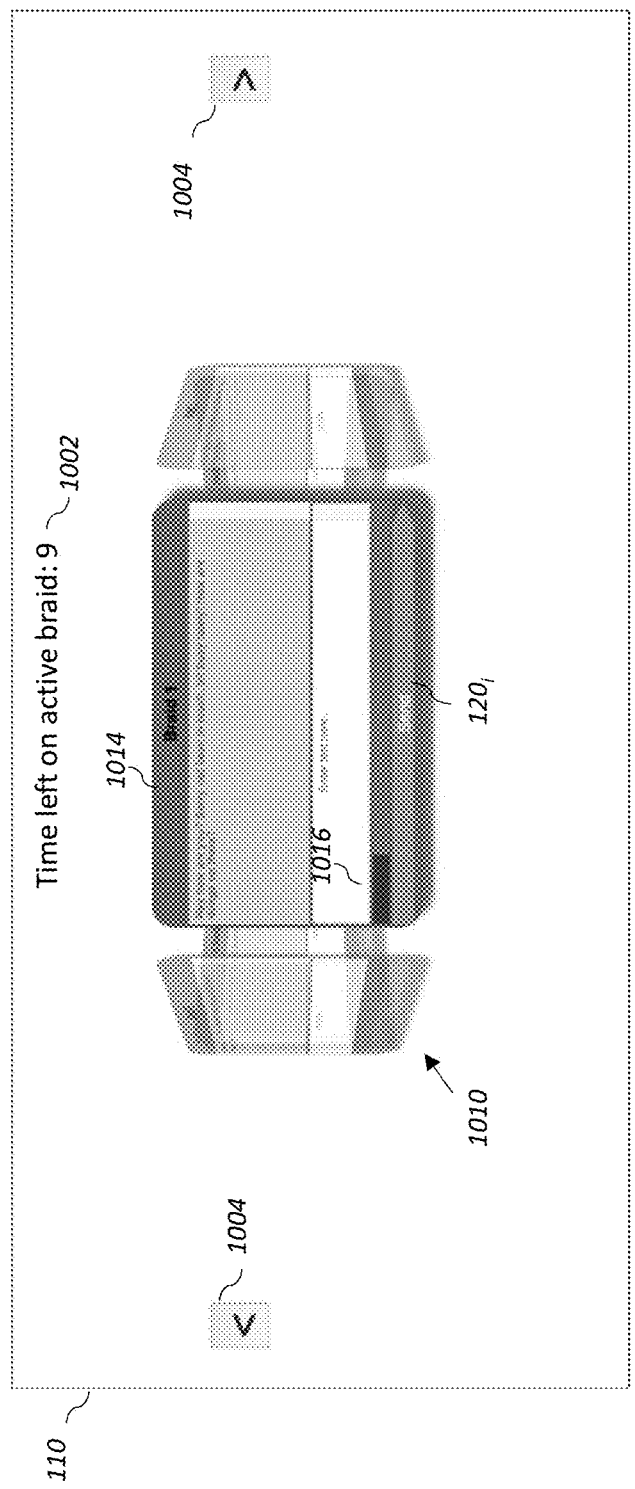
FIG. 10 is a simulation of a communication session between two users and with six braids.

An example of such configuration is shown in FIG. 10 which is a simulation of a communication session between two users and with six braids. In this simulation, the graphical user interface 110 comprises a carousel 1010 and the graphical elements are displayed around the carousel. The currently active graphical element $120_i$ is highlighted with a graphical emphasis, for example being shown as a green bar 1014 at the top. A message 1002 and a moving countdown time bar 1016 at the bottom of the currently active graphical element $120_i$ inform the user of the time left to input a communication in graphical element $120_i$.

At any time the user is free to rotate the carousel by selecting arrows 1004. This allows him to review past communications exchanged with the other participants in other graphical elements. However, the user is only able to input new communications into the active graphical element.

Figure 11:
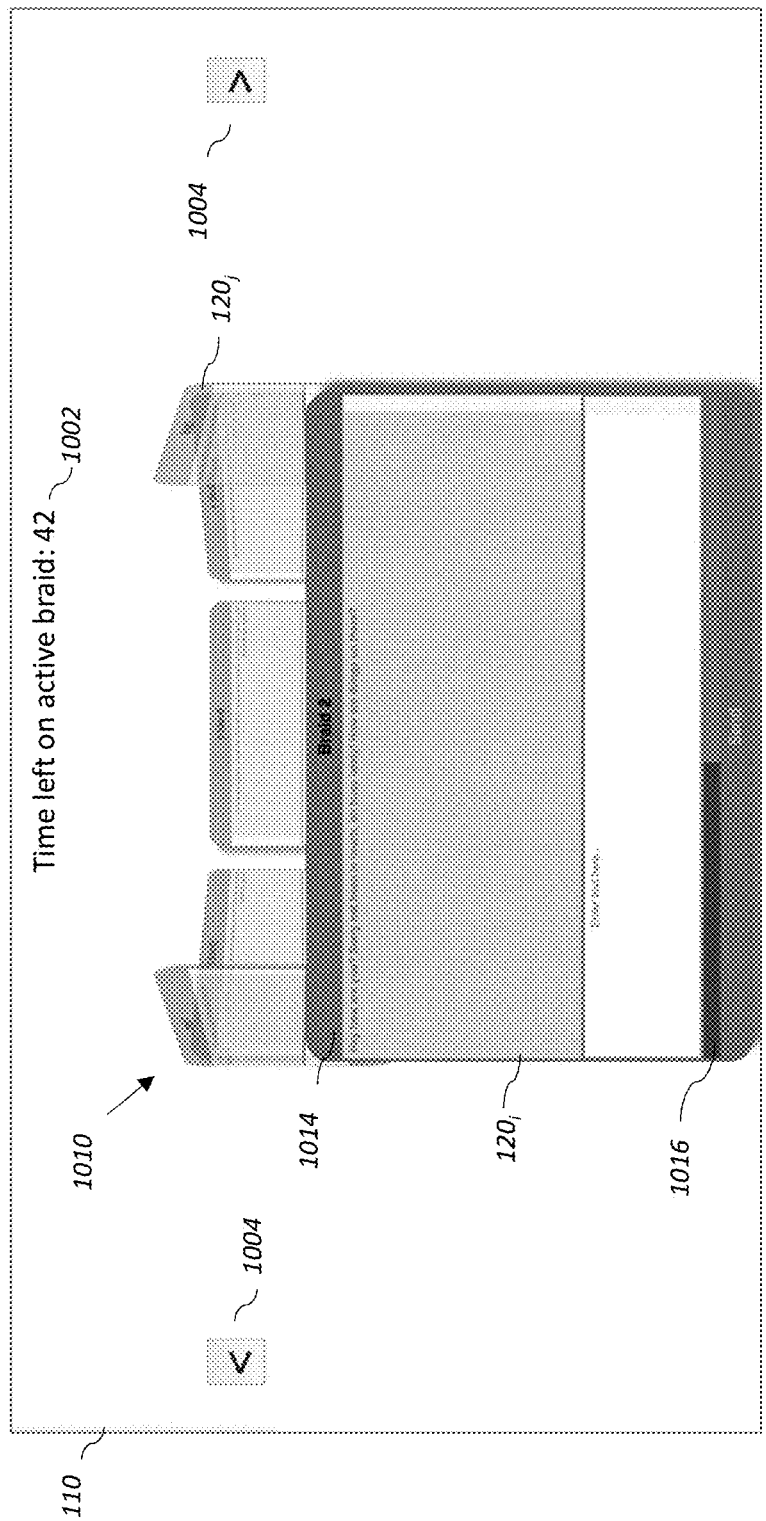
FIG. 11 is a simulation of the communication session of FIG. 10 wherein a graphical element has been selected for inputting a communication.

The graphical user interface may be configured such that when the user moves to a specific graphical element $120_i$, that graphical element is enlarged and moved to the foreground, as shown in FIG. 11. Different graphical emphasis mechanisms, such as different coloured bars 1014 may be associated to different states of the graphical element $120_i$ selected by the user. For example, the graphical element $120_i$ may be shown with a green top bar if it is currently active, whereas a grey top bar may be used to indicate that the selected graphical element is currently inactive and the user can only look at past communications but not input new communications.

The carousel 1010 is just an example of a possible configuration. The possible configurations are in fact unlimited and it is anticipated that each user may define their own individual configuration independently of the configuration(s) chosen by the other user(s). The graphical user interface 110 may be configured to request the user to select a configuration from a list of saved configurations stored in a memory or it may allow the user to setup their own preferred configuration.

For example, the graphical user interface 110 may be displayed on a touch screen and the participants may be able to modify the configuration of the graphical elements 120 by dragging each graphical element $120_i$ around the screen. However, the graphical elements 120 would still be activated according to the cyclic order and the user would not be allowed to modify the cyclic order.

Although in the example illustrated in FIGS. 1 to 9 only two users are shown, it will be appreciated that in principle any number of participants equal to or larger than 2 may join the communication session. It will also be appreciated that the term "user" or "participant" to the braided space is herein not limited to one individual human being. "User" and "participant" are intended to represent one end point of the communication channel and therefore may correspond to one or more human beings. In some embodiments, a "user" or "participant" may even correspond to a robot or other computer implemented device capable of generating human-like inputs, a group thereof or a mixture of humans and computer implemented devices.

Figure 12:
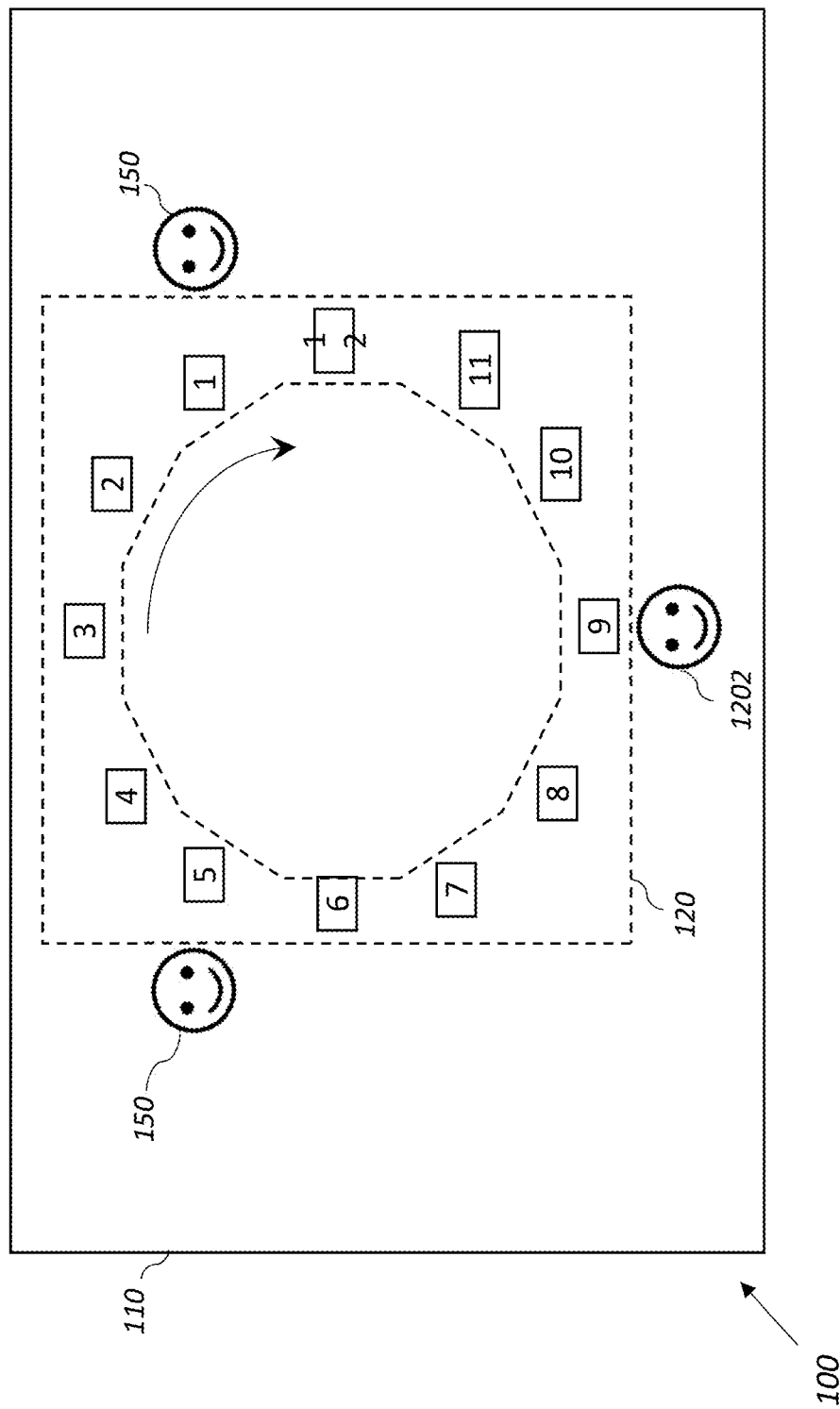
FIG. 12 is a schematic diagram of the system of FIG. 1 in use by three users.

FIG. 12 shows the system 100 in use in a hypothetical scenario wherein a third user joins the communication session. The third user is represented in the graphical user interface 110 by a new indicator 1202.

In this hypothetical scenario, the first user is a first astronaut in transit in space, the second user is a person on Earth and the third user is a second astronaut in transit at a different location of space. The two astronauts are the two participants separated by the greatest distance from each other, in this example 2 light minutes and 45 light seconds away from each other. Therefore, the communication channel between the two astronauts will be affected by a latency $\Delta t_L$, of at least 2 minutes and 45 seconds. To compensate for the increased delay in the exchange of messages as compared to the scenario of FIGS. 2 and 3, 12 braids are now used instead of six and corresponding additional graphical elements are added to the plurality of graphical elements 120.

Figure 13:
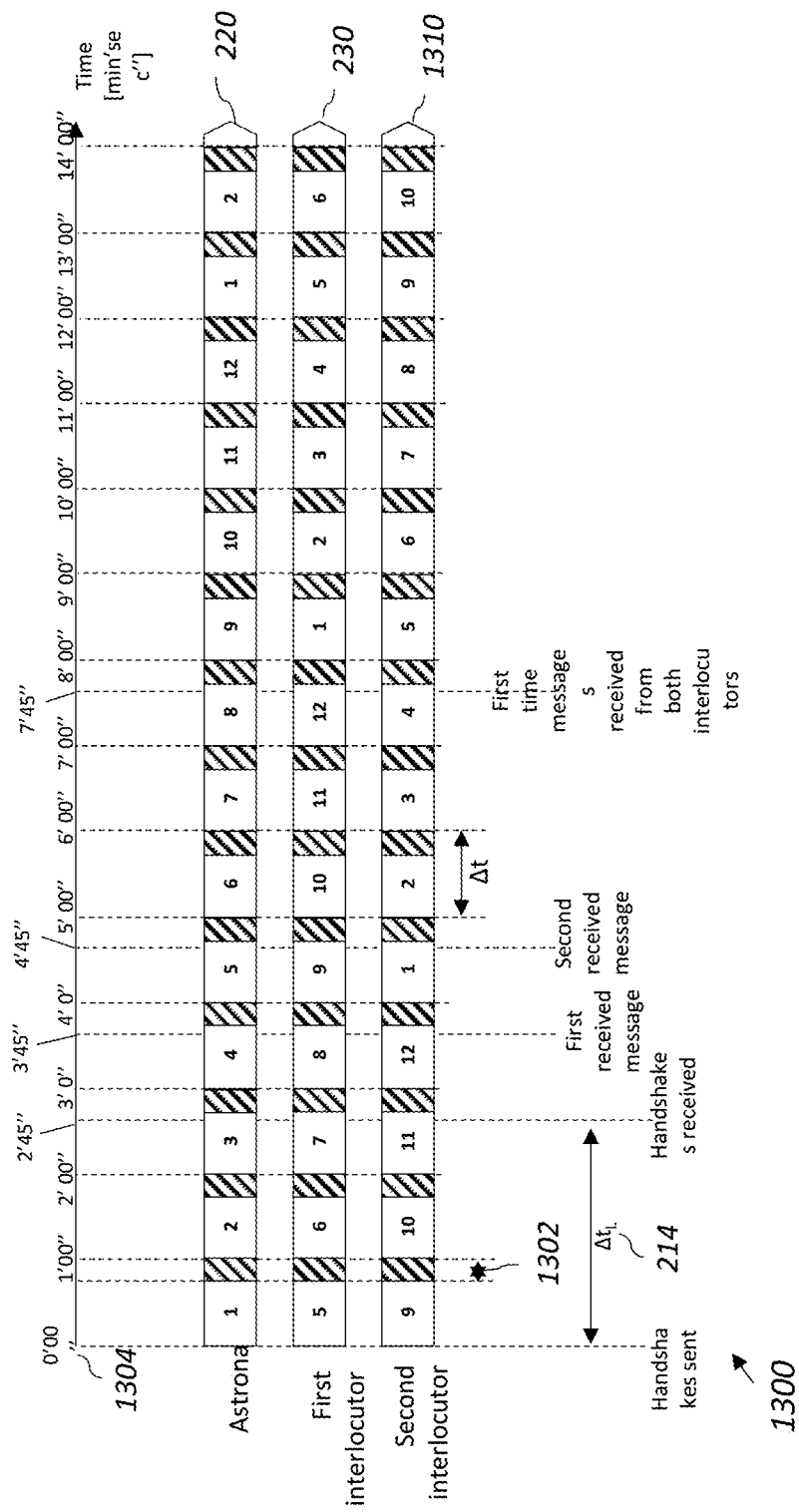
FIG. 13 is a time diagram illustrating an operation mode of the system of FIG. 12.

FIG. 13 is a time diagram illustrating an operation mode of the system of FIG. 12. The time diagram 1300 is analogous to the time diagram 200 of FIG. 2 and shows the timing of the exchange of communications between the astronauts and the person on Earth of FIG. 12 during a first phase of a communication session.

The top row 220, middle row 230 and bottom row 1310 of the diagram illustrates which graphical elements $120_i$ are active at a given time for the first astronaut, the person on Earth and the second astronaut respectively.

The different numbers in the rows 220, 230 and 1310 correspond to different active braids and graphical elements $120_i$. In this example, the activation time intervals $\Delta t_i$, are all set to $\Delta t=1$ minute and the three participants can each independently choose to send the communication up to a predetermined time interval 1302 of 10 seconds before the lapse of each activation time interval $\Delta t_i$, similarly to the operation mode illustrated in FIG. 3 for the scenario of FIG. 1. The striped patterns in the rows represent time intervals wherein either of the two adjacent graphical elements may be active, based on whether the corresponding participant has manually sent a communication ahead of the lapse of an activation time interval $\Delta t_i$ or not.

At a previously agreed initial time 1304, the astronauts and the person on Earth join the communication session and an automatic handshake is sent from each user to the other users.

The users then interact with each graphical element $120_i$ at a controlled pace and according to the cyclic order associated with the graphical elements 120, as previously explained. In particular, in this session each participant starts from a different graphical element which is three places removed in the cyclic order from the graphical elements from which the other participants start. However, each different communication session may be setup with different initial conditions.

After 2 minutes and 45 seconds the handshakes sent at the initial time 1304 are received by each participant and the graphical user interface 110 notifies the astronauts and the person on Earth that the other participants are present.

At 3 minutes and 45 seconds the first astronaut receives the first message input by the person on Earth in the graphical element $120_5$. Similarly, the person on Earth receives the first message that the second astronaut has input in graphical element $120_9$ and the second astronaut receives the first message that the first astronaut has input in the graphical element $120_1$. However, each of them can only input a reply after the graphical element is activated in their respective graphical user interface.

At each subsequent activation time interval, the participants receive more messages corresponding to different graphical elements 120. The first time at which each participant first receives a message from both the other participants will be at 7 minutes and 45 seconds.

If more than two users participate to a communication session, the activation time interval and number of braids may be selected based on the latency of the communication channel between the two users that are farthest away from each other. In this scenario, users that are at closer distances may receive other users' communications at a time considerably ahead of the time wherein the corresponding graphical elements are due to activated. In this case, the communications would be stored in a memory or buffer until the corresponding graphical elements are activated.

Figure 14:
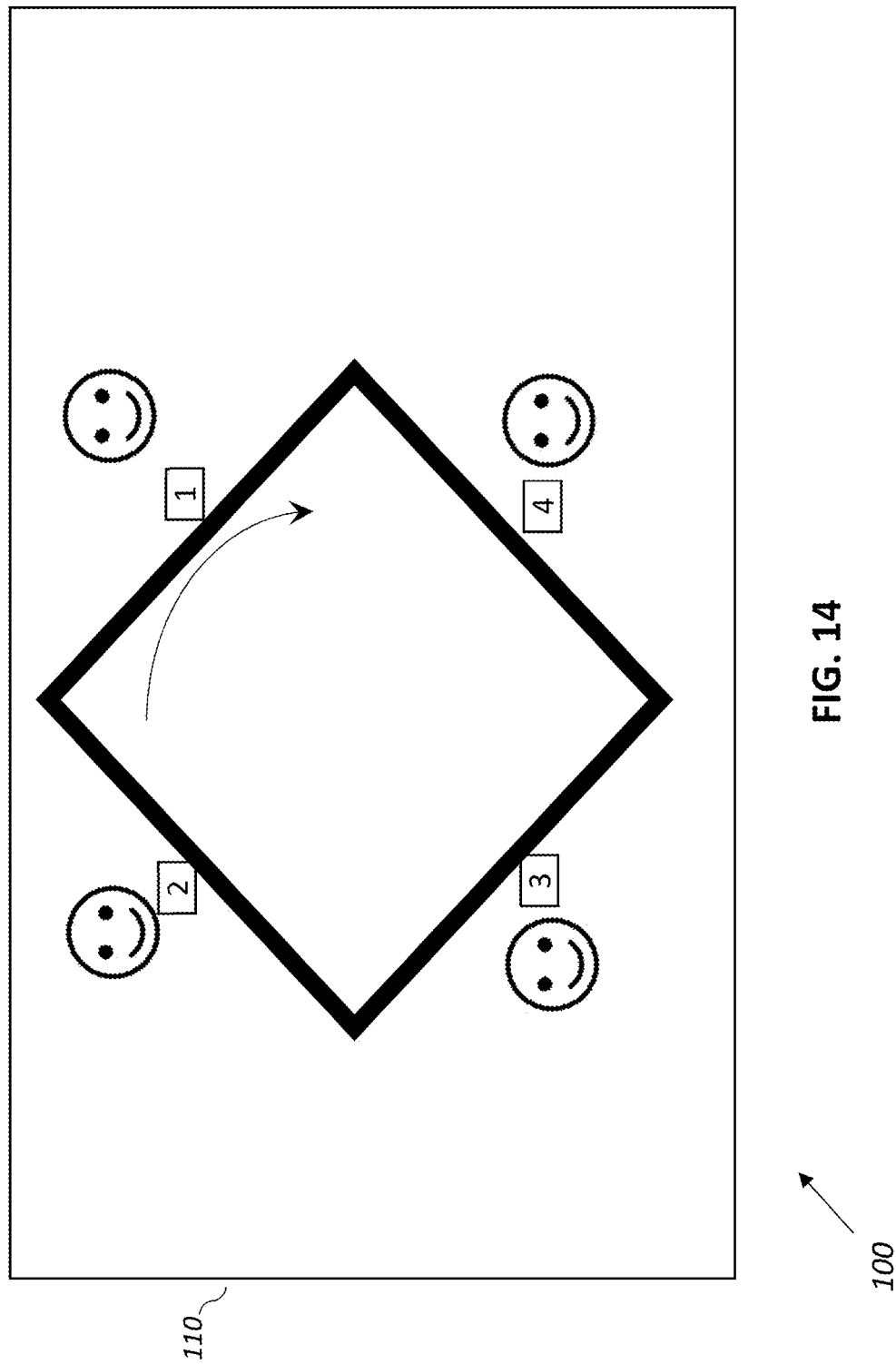
FIG. 14 is a schematic diagram of the system of FIG. 1 in use by four users and with four braids.

FIG. 14 shows another hypothetical scenario wherein a communication session is setup with four participants and four braids. In this case at each activation time interval all the braids would be in use by one of the participants therefore this setup would be most suitable for applications wherein there is no or very short latency in the communication channel, since there is no compensation for delays. For example, this setup may be used in applications wherein all users are on Earth as a way to enhance contributions from all participants within a multiparty instant message conversation or similar.

Alternatively, the graphical user interface 110 may be configured such that a user can participate to multiple braided spaces simultaneously and each braided space may be used to communicate with a different participant or group of participants.

In scenarios with multiple participants, a participant may be allowed to join or leave the braided space during the communication session and the system 100 may be configured to adjust the number of braids and/or any of the time parameters based on the new number of participants.

Figure 15:
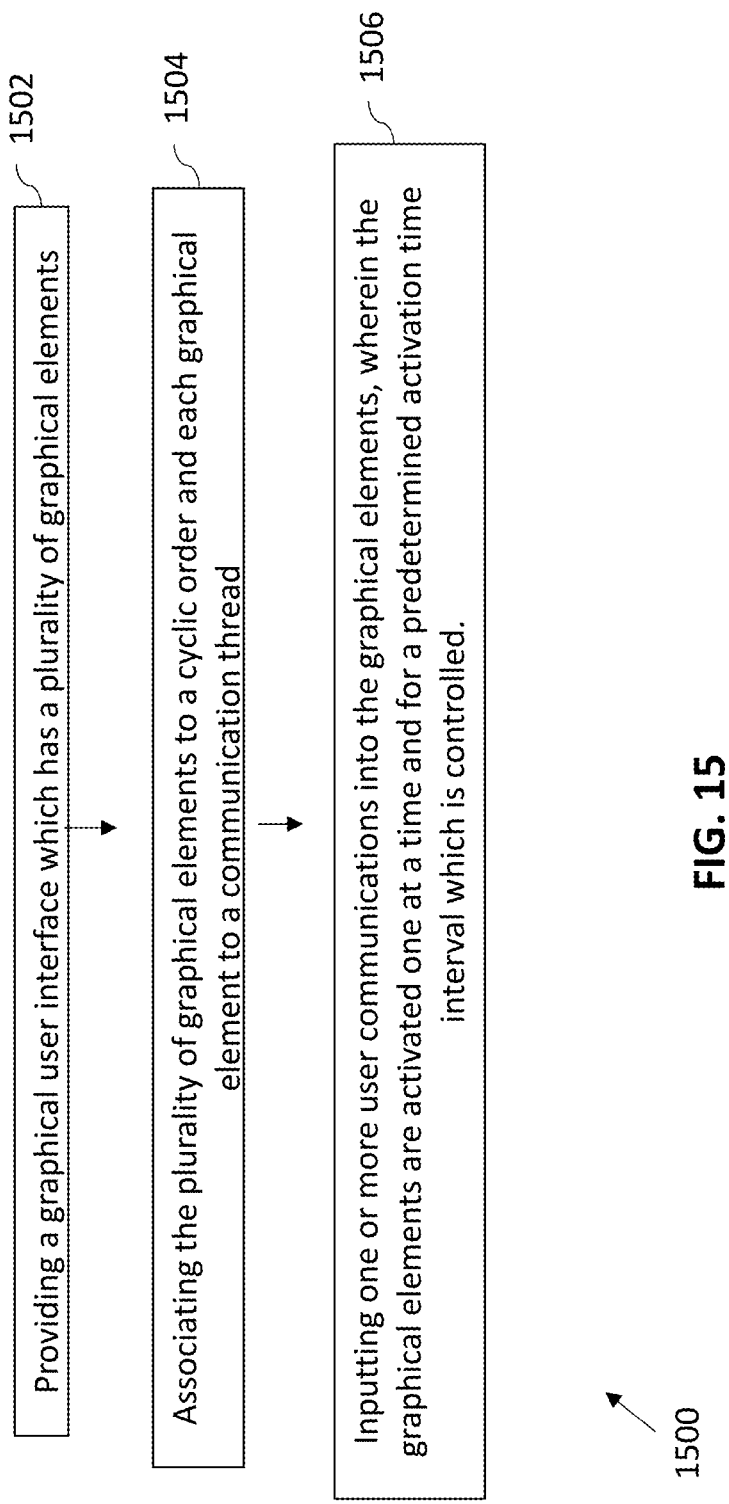
FIG. 15 a schematic diagram of a method for exchanging communications between two or more users and according to an aspect of the present disclosure.

FIG. 15 is a schematic diagram of a method for exchanging communications between two or more users and in accordance with an aspect of the present disclosure.

The method comprises providing a graphical user interface which has a plurality of graphical elements (step 1502), associating the plurality of graphical elements to a cyclic order and each graphical element to a communication thread (step 1504). The method further comprises inputting one or more user communications into the graphical elements, wherein the graphical elements are activated one at a time and for a predetermined activation time interval which is controlled (step 1506). Optionally, controlling the activation time interval comprises adjusting the activation time intervals based on a latency parameter, which may be for example an estimated or a measured latency of the communication channel over which the communications are sent.

In some embodiments, the method 1500 comprises continuously adjusting the activation time intervals based on a continuously changing relative distance between the users.

It will be appreciated that the systems and methods described above in relation to the first and second aspect of the present disclosure may be embodied directly in a hardware or software module or a combination thereof. In particular, the system 100 may be implemented on a mobile device, such as phone, tablet or laptop. Alternatively, the system 100 may be implemented on a desktop, TV or any other device which comprises a display for displaying the graphical user interface 110. For example, the graphic user interface 110 may be configured to be displayed on a built-in screen of a spacecraft or any other screen built into devices which are a part of an astronaut's standard equipment.

Figure 16:
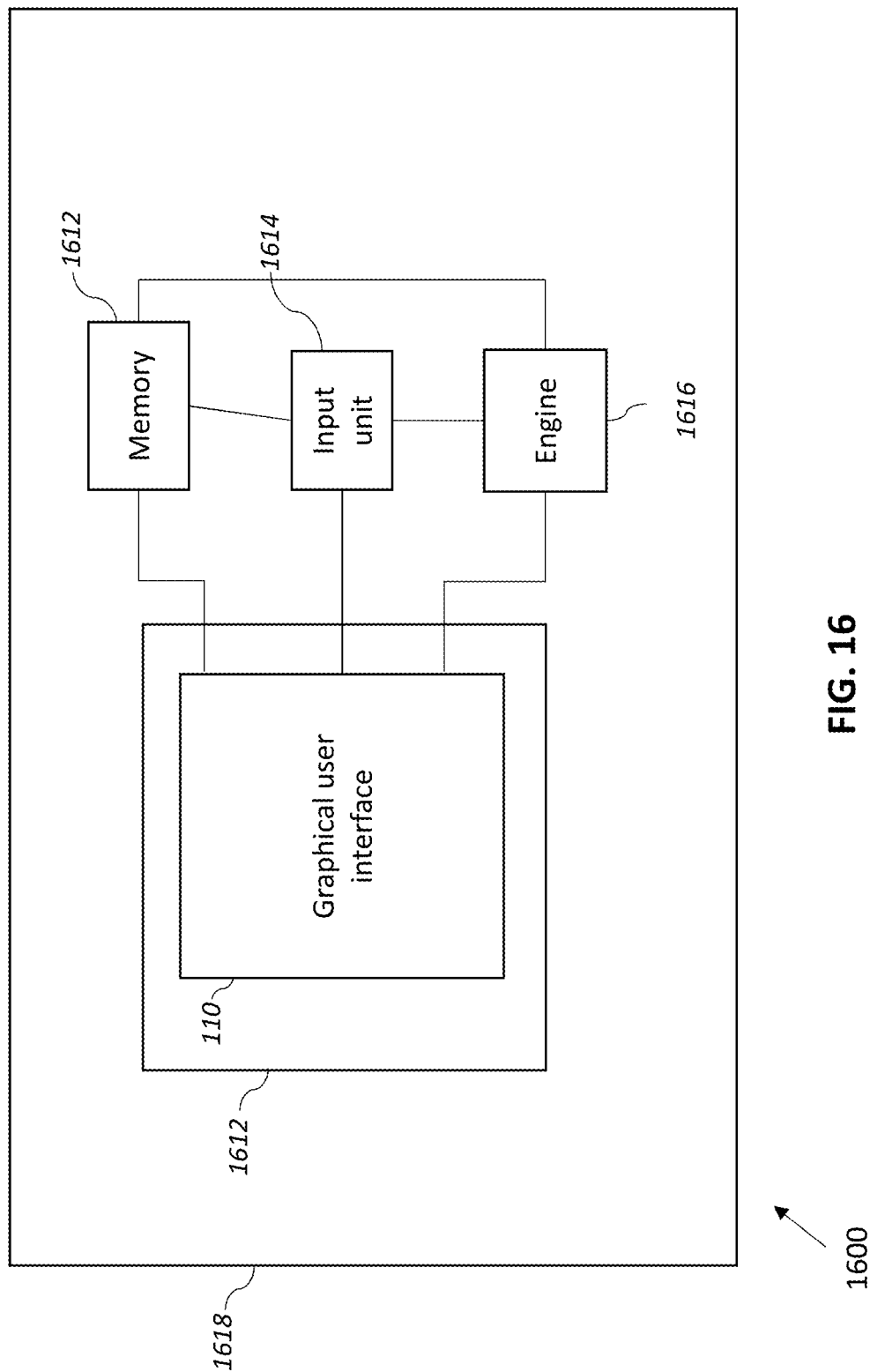
FIG. 16 is a schematic diagram of an embodiment of the system of FIG. 1 in accordance with the present disclosure.

FIG. 16 is a schematic diagram of an embodiment of the system 100 in accordance with the present disclosure. The system 1600 comprises a user terminal 1610 which has a memory 1612, an input unit 1614, an engine 1616 and a display 1618. The system 1600 is configured such that the graphical user interface 110 is displayed on the display 1618 and can interact with the memory 1612, the input unit 1614 and the engine 1616. The input unit 1614 may comprise one or more input devices that enable the user to input communications to the graphical user interface 110, such as a keyboard, microphone, camera, touchpad or touchscreen, to name just a few.

The system 100 may be configured to provide speech-to-text functionality and allow the user to interact with the system and input all communications exclusively via spoken instructions.

The system 1600 may further comprise one or more output devices (not shown). For example, the system 1600 may comprise speakers or other similar audio outputs and a text-to-speech algorithm such that a user may opt to have all the received communications, including interface notifications and updates, read aloud to them. For example, the system 1600 may be configured to provide audio notifications for each action implemented by the system and shown on the graphical user interface 110 such that when a user is not able to look at the graphical user interface 110, they would still be able to interact with it.

In further embodiments, a graphical user interface may be omitted entirely and the system can provide a "braided space" communication system in an entirely non-graphical fashion. This may comprise a communication system that exclusively uses audio prompts and receives audio inputs. The underlying concept of having a plurality of different "braids" or communication threads with a controlled cadence of communication is the same as described elsewhere herein.

A graphical user interface may be omitted at one or both ends of the communication system.

As an example, an astronaut may have to go on an extended space walk to fix something on the outside of the ship. During this time, say during a long pause in operations, they may wish to engage in a braided communication session. They don't have a screen or keyboard but they do have earphones and a microphone and are linked to the ship's computer which may be running software implementing the system of the present disclosure. The astronaut may join the braided session using simple audio commands. The system may say "Sending braid 3"; "Braid 4, Jim's new job, is now active. New content is {and then announcing the content}"; then the astronaut may respond: "{response content}"; and may also issue command such as: ""Please go to braid 1 and read out the last two entries".

As a further example, a participant in a terrestrial braided space within an instant message system may be blind or partially sighted, and so may choose to join the session via an audio only interface. The other participants may also choose an audio only interface or may choose to use a graphical user interface. In some embodiments, the engine 1616 may be configured to detect or compute data related to users' behaviours and compute user-specific recommendations for the activation time intervals, the number of braids and any other customizable parameter via machine learning or other computational methods.

In some embodiments, the engine 1616 may further be configured to generate machine-generated replies to a user's communications, such as questions modelled on past recorded behaviours of a specific interlocutor or game moves.

In some embodiments, the engine 1616 may be configured to detect via machine learning algorithms if a user is departing from a topic associated with a specific braid and display an alert message that encourages the user not to mix different conversation threads to avoid confusion.

In some embodiments the engine 1616 and/or the memory 1612 may not be physically embedded in the user terminal 1618 but may be remotely located.

In operation, the system 1600 is configured to send user communications to one or more other user terminals to be used by other participants during a communication session. Each of the other user terminals will preferably comprise at least a display and may additionally comprise one or more of the other components of the user terminal 1618.

Each user terminal may also comprise a buffer such that at each transmission of communications between the user terminals, the transmitted communications will be gathered together at the far end in the background before being presented to the user by the graphical user interface 110. This might be useful in scenarios wherein the bandwidth of the transmission channel is limited and/or multiple transmission attempts are required or beneficial to reduce transmission errors.

The skilled person will appreciate that the systems and methods according to the present disclosure may function on top of any appropriate present or future underlying transmission technology.

It will also be appreciated that although the above description is focussed on a space application, the system and methods described in relation to the present disclosure may be used in different scenarios, including but not limited to terrestrial scenarios. In particular, the system 100 may be deliberately used also in situations where there is no or minimal latency in the communication channel for the simple purpose of providing a more efficient communication system or of ensuring that all participants contribute to the conversation. The system 100 may further be used in scenarios where particularly complex or sensitive topics are being discussed to impose more careful reflection on each exchanged communication.

The disclosure overcomes limitations of the prior art by deconvoluting a conversation into constituent threads (which may correspond to a specific semantic theme), each thread being presented to the user for the user to engage with in a controlled sequence and syncopated rhythm.

Interlocuters engaging with one another in such a style and rhythm could do so using any of their senses (sight and typing, sight and speech, hearing and speech, braille and touch). A user interface according to this disclosure will be able to offer all of these configurations to account for user preferences and contexts of use. For connections with large latency, the system allows parties to feel a greater sense of connection and this can enhance emotional wellbeing, reduce stress and therefore improve mission performance.

It will be appreciated that various improvements and modifications can be made to the above without departing from the scope of the disclosure.

What is claimed is:

1. A system for exchanging communications via a communication channel between a first terrestrial user and a second user in space, the system comprising:
    a computing device configured to provide a graphical user interface,
    wherein the graphical user interface has a plurality of graphical elements,
    the plurality of graphical elements is associated with a cyclic order, and
    each graphical element corresponds to a communication thread;
    a locating device for detecting spatial coordinates of a spacecraft carrying the second user; and
    a memory storing the spatial coordinates of the spacecraft and related latency data from which a latency parameter is determined,
    wherein the plurality of graphical elements has an input for receiving one or more user communications,
    wherein the plurality of graphical elements includes a graphical element that is active if the input of new communications into the graphical element is enabled,
    wherein the graphical user interface is configured so that only one graphical element is active at each time and each graphical element is continuously active for a predetermined activation time interval,
    wherein the activation time interval of each graphical element is controlled according to the latency parameter, and
    wherein the graphical user interface is configured to access the memory in order to determine the latency of the communication channel based on the current spatial coordinates of the spacecraft.

2. The system of claim 1, wherein the latency parameter is related to an estimate, calculation or measure of a latency of the communication channel over which the communications are sent.

3. The system of claim 1, wherein the latency parameter is updated automatically as the latency of the communication channel changes.

4. The system of claim 1, wherein the exchanging communications is between at least three users, wherein the latency of the communication channel is estimated or calculated based on the distance between the two users that are farthest away from each other.

5. The system of claim 1, wherein the latency parameter is related to a behavior of at least one of said users.

6. The system of claim 5, wherein the behavior comprises an average time taken to input a communication.

7. The system of claim 1 wherein the graphical elements are represented in the graphical user interface according to the cyclic order.

8. The system of claim 1, wherein the graphical elements are arranged in the graphical user interface in a carousel configuration.

9. The system of claim 1, wherein each communication thread corresponds to a conversation topic.

10. The system of claim 1, wherein each conversation thread corresponds to a conversation with a different user.

11. The system of claim 1, wherein the number of graphical elements is also controlled according to the latency parameter.

12. The system of claim 1, wherein the system further comprises at least a first user terminal for use by one of said users and a second user terminal for use by the other of said users, each terminal having a display configured to display the graphical user interface.

13. The system of claim 12, wherein the system further comprises at least one memory and one engine configured to interact with the first user terminal and with the second user terminal and wherein each user terminal comprises an input unit for inputting user communications.

14. A method for exchanging communications via a communication channel between a first user and a second user, the method comprising:
    providing a graphical user interface which has a plurality of graphical elements;
    associating the plurality of graphical elements with a cyclic order;
    associating each graphical element to a communication thread;
    inputting one or more user communications into the graphical element;
    detecting the spatial coordinates of a spacecraft carrying the second user using a locating device;
    determining a latency parameter from a memory storing spatial coordinates of the spacecraft and related latency data;
    activating a graphical element by enabling the input of new communications via that graphical element;
    wherein the graphical elements are activated one at a time and for a predetermined activation time interval;

wherein the activation time interval of each graphical element is controlled by adjusting the activation time interval based on the latency parameter; and wherein the graphical user interface is configured to access the memory in order to determine the latency of the communication channel based on the current spatial coordinates of the spacecraft.

15. The method of claim 14, wherein estimating or calculating the latency of the communication channel comprises estimating or calculating a distance between the two users among the said two or more users that are farthest away from each other and accessing data stored in a memory to determine a corresponding latency.

16. A system for exchanging communications via a communication channel between a first terrestrial user and a second user in space, the system comprising:
   a computing device configured to provide a user interface;
   a locating device for detecting spatial coordinates of a spacecraft carrying the second user; and
   a memory storing the spatial coordinates of the spacecraft and related latency data from which a latency parameter is determined, wherein:
   the user interface provides a plurality of communication threads associated with a cyclic order; and
   the plurality of communication threads includes a communication thread that is active if the input of new communications into that communication thread is enabled;
   the user interface is configured such that only one communication thread is active at each time and each communication thread is continuously active for a predetermined activation time interval;
   the activation time interval of each communication thread is controlled according to the latency parameter; and
   the graphical user interface is configured to access the memory in order to determine the latency of the communication channel based on the current spatial coordinates of the spacecraft.

17. The system of claim 1, wherein the latency parameter is based on actual or planned spatial coordinates of a spacecraft carrying a user who is in space.

* * * * *